(12) United States Patent
Tirumalai et al.

(10) Patent No.: US 7,257,810 B2
(45) Date of Patent: Aug. 14, 2007

(54) METHOD AND APPARATUS FOR INSERTING PREFETCH INSTRUCTIONS IN AN OPTIMIZING COMPILER

(75) Inventors: Partha P Tirumalai, Fremont, CA (US); Spiros Kalogeropulos, Los Gatos, CA (US); Mahadevan Rajagopalan, Fremont, CA (US); Yonghong Song, San Jose, CA (US); Vikram Rao, San Mateo, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 618 days.

(21) Appl. No.: 10/052,999

(22) Filed: Nov. 2, 2001

(65) Prior Publication Data

US 2003/0088864 A1    May 8, 2003

(51) Int. Cl.
*G06F 9/44* (2006.01)
*G06F 9/45* (2006.01)
*G06F 9/30* (2006.01)

(52) U.S. Cl. .................. 717/160; 717/158; 712/207
(58) Field of Classification Search ......... 717/151–161
See application file for complete search history.

(56) References Cited

U.S. PATENT DOCUMENTS

| | | | | | |
|---|---|---|---|---|---|
| 5,349,656 | A | * | 9/1994 | Kaneko et al. | 718/102 |
| 5,367,656 | A | * | 11/1994 | Ryan | 711/213 |
| 5,704,053 | A | * | 12/1997 | Santhanam | 717/158 |
| 5,933,643 | A | | 8/1999 | Holler | 395/709 |
| 5,950,003 | A | * | 9/1999 | Kaneshiro et al. | 717/130 |
| 6,047,363 | A | * | 4/2000 | Lewchuk | 711/213 |

(Continued)

FOREIGN PATENT DOCUMENTS

EP    0 743 598 A2    11/1996

(Continued)

OTHER PUBLICATIONS

P. Tirumalai, et al., Processor Aware Anticipatory Prefetching in Loops, Feb. 14, 2004, Sun Microsystems, Inc., pp. 1-10.*

(Continued)

*Primary Examiner*—Tuan Dam
*Assistant Examiner*—Andre R Fowlkes
(74) *Attorney, Agent, or Firm*—Park, Vaughan & Fleming LLP

(57) ABSTRACT

One embodiment of the present invention provides a system that generates code to perform anticipatory prefetching for data references. During operation, the system receives code to be executed on a computer system. Next, the system analyzes the code to identify data references to be prefetched. This analysis can involve: using a two-phase marking process in which blocks that are certain to execute are considered before other blocks; and analyzing complex array subscripts. Next, the system inserts prefetch instructions into the code in advance of the identified data references. This insertion can involve: dealing with non-constant or unknown stride values; moving prefetch instructions into preceding basic blocks; and issuing multiple prefetches for the same data reference.

17 Claims, 6 Drawing Sheets

U.S. PATENT DOCUMENTS

| | | | | |
|---|---|---|---|---|
| 6,055,558 | A | * | 4/2000 | Lin et al. .................... 718/100 |
| 6,154,826 | A | * | 11/2000 | Wulf et al. ................. 711/217 |
| 6,401,187 | B1 | * | 6/2002 | Motokawa et al. ......... 711/213 |
| 6,539,541 | B1 | * | 3/2003 | Geva .......................... 717/150 |
| 6,675,374 | B2 | * | 1/2004 | Pieper et al. ............... 717/141 |
| 6,901,593 | B2 | * | 5/2005 | Aweya et al. .............. 718/104 |
| 6,961,930 | B1 | * | 11/2005 | Waldspurger et al. ...... 717/141 |
| 2002/0069375 | A1 | * | 6/2002 | Bowen ....................... 713/400 |
| 2003/0005419 | A1 | * | 1/2003 | Pieper et al. ............... 717/141 |
| 2003/0066061 | A1 | * | 4/2003 | Wu et al. ................... 717/158 |

FOREIGN PATENT DOCUMENTS

| | | |
|---|---|---|
| EP | 0 840 209 A2 | 10/1997 |
| WO | 01/44927 A2 | 6/2001 |
| WO | 01/52061 | 7/2001 |
| WO | 01/52061 A2 | 7/2001 |

OTHER PUBLICATIONS

T. Mowry, et al., Design and Evaluation of a compiler algorithm for prefetching. Sep. 1992. Proceedings of the 5th International Conference on Architectural Support for Programming Languages and Operating Systems. pp. 63-73.*

C.-K. Luk, et al., Compiler-based prefetching for recursive data structures. Oct. 1996. Proceedings of the 7$^{th}$ International Conference on Architectural Support for Programming Languages and Operating Systems. pp. 222-234.*

C.-K. Luk and T. Mowry. Architectural and compiler support for effective instruction prefetching: A cooperative approach. ACM Transactions on Computer Systems Feb. 2001 (TOCS), vol. 19, Issue 1. pp. 71-109.*

Publication entitled "Design and Evaluation of a Compiler Algorithm for Prefetching", by Todd C. Mowry et al., ACM Sigplan Notices, Sep. 1992, No. 9, XP000330590, pp. 62-73.

* cited by examiner

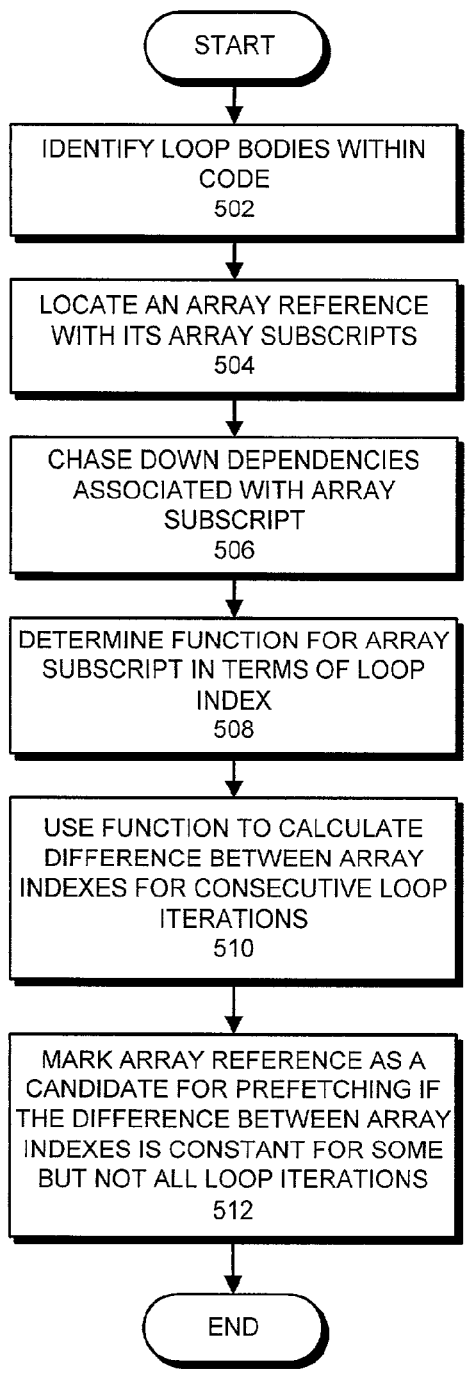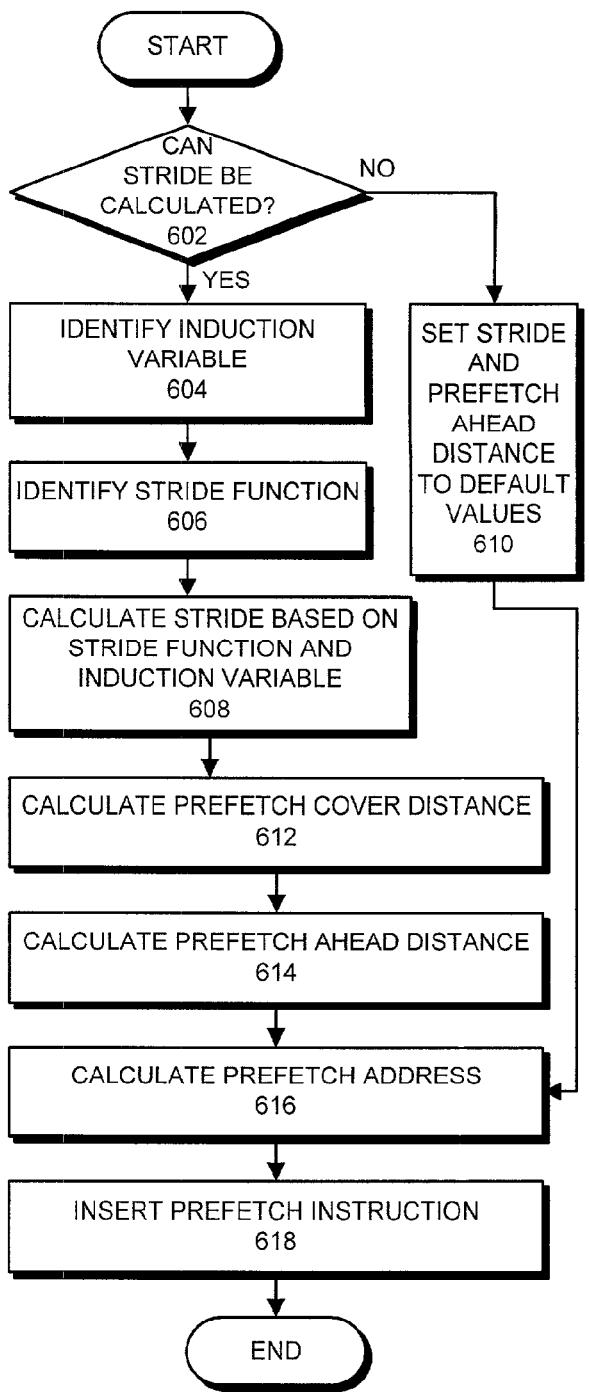
FIG. 5
FIG. 6

METHOD AND APPARATUS FOR INSERTING PREFETCH INSTRUCTIONS IN AN OPTIMIZING COMPILER

RELATED APPLICATION

The subject matter of this application is related to the subject matter in a co-pending non-provisional application by the same inventors as the instant application and filed on the same day as the instant application entitled, "Method and Apparatus for Selecting References for Prefetching in an Optimizing Compiler" having Ser. No. 10/052,997, and filing date Nov. 2, 2001.

BACKGROUND

1. Field of the Invention

The present invention relates to compilers for computer systems. More specifically, the present invention relates to a method and an apparatus for performing anticipatory prefetching for data references within an optimizing compiler.

2. Related Art

Advances in semiconductor fabrication technology have given rise to dramatic increases in microprocessor clock speeds. This increase in microprocessor clock speeds has not been matched by a corresponding increase in memory access speeds. Hence, the disparity between microprocessor clock speeds and memory access speeds continues to grow, which can cause performance problems. Execution profiles for fast microprocessor systems show that a large fraction of execution time is spent not within the microprocessor core, but within memory structures outside of the microprocessor core. This means that the microprocessor systems spend a large fraction of time waiting for memory references to complete instead of performing computational operations.

In order to remedy this problem, some microprocessors provide hardware structures to facilitate prefetching of data and/or instructions from memory in advance of wherein the instructions and/or data are needed. Unfortunately, because of implementation constraints, these hardware prefetching structures have limited sophistication, and are only able to examine a limited set of instructions to determine which references to prefetch. As more processor clock cycles are required to perform memory accesses, prefetch operations must take place farther in advance of where the prefetched data is needed. This makes it harder for hardware prefetching mechanisms to accurately determine what references to prefetch and when to prefetch them.

What is needed is a method and an apparatus for performing prefetch operations in farther advance of where the prefetched data is required.

SUMMARY

One embodiment of the present invention provides a system that generates code to perform anticipatory prefetching for data references. During operation, the system receives code to be executed on a computer system. Next, the system analyzes this code to identify data references to be prefetched. This analysis involves performing a first marking phase in which only data references located in blocks that are certain to execute are considered in determining which data references are covered by preceding data references. It also involves performing a second marking phase in which data references that are located in blocks that are likely but not certain to execute are considered. The system then inserts prefetch instructions into the code in advance of the identified data references.

In a variation on the above embodiment, the system additionally profiles execution of the code to produce profiling results, and uses the profiling results to determine whether a given block of instructions is executed frequently enough to perform the second marking phase.

In a variation on the above embodiment, determining whether the given block of instructions is executed frequently enough involves comparing a frequency of execution for the given block from the profiling results with a threshold value indicating a minimum frequency of execution to be considered in the second marking phase.

In a variation on the above embodiment, analyzing the code involves identifying loop bodies within the code, and identifying data references to be prefetched from within the loop bodies. In a further variation, if there exists a nested loop within the code, the system examines an innermost loop in the nested loop. If this innermost loop is smaller than a minimum size or is executed fewer than a minimum number of iterations, the system examines a loop outside the innermost loop.

In a variation on the above embodiment, analyzing the code involves examining a pattern of data references over multiple loop iterations.

In a variation on the above embodiment, the system is implemented within a compiler.

One embodiment of the present invention provides a system for generating code to perform anticipatory prefetching for data references. During operation, the system receives code to be executed on a computer system. Next, the system analyzes this code to identify data references to be prefetched. This analysis involves examining an array reference made through an array subscript. In performing this analysis, the system determines a function for the array subscript in terms of a loop index, and uses the function to calculate a difference between array indexes for consecutive loop iterations. Next, the system considers the array reference as a candidate for prefetching if the difference between array indexes for consecutive loop iterations is a constant value. The system then inserts prefetch instructions into the code in advance of the identified data references.

In a variation on the above embodiment, the system determines the function for the array subscript by chasing down data dependencies associated with the array subscript if such data dependencies exist.

In a variation on the above embodiment, the array reference is considered as a candidate for prefetching if the difference between array indexes is a constant value for some but not all consecutive loop iterations.

In a variation on the above embodiment, the array reference is considered as a candidate for prefetching if the difference between array indexes depends on a modulo operator that causes the difference between array indexes to occasionally vary from a constant value.

One embodiment of the present invention provides a system for generating code to perform anticipatory prefetching for data references. During operation, the system receives code to be executed on a computer system. Next, the system analyzes this code to identify data references to be prefetched, and inserts prefetch instructions into the code in advance of the identified data references. While inserting the prefetch instructions, the system attempts to calculate a stride value for a given data reference within a loop. If the stride value cannot be calculated, the system sets the stride value to a default stride value. Next, the system inserts a prefetch instruction to prefetch the given data reference for a subsequent loop iteration based on the stride value.

In a variation on the above embodiment, the system allows a user to specify the default stride value.

In a variation on the above embodiment, calculating the stride value involves identifying an induction variable and a stride function for the stride value and then calculating the stride value based upon the stride function and the induction variable.

In a variation on the above variation, while inserting the prefetch instruction based on the stride value, the system calculates a prefetch cover distance by dividing a cache line size by the stride value. The system also calculates a prefetch ahead distance as a function of a prefetch latency, the prefetch cover distance and an execution time of a loop. The system finally calculates a prefetch address by multiplying the stride value by the prefetch cover distance and the prefetch ahead distance and adding the result to an address accessed by the prefetch candidate.

One embodiment of the present invention provides a system for generating code to perform anticipatory prefetching for data references. During operation, the system receives code to be executed on a computer system. The system then analyzes this code to identify data references to be prefetched. Next, the system inserts prefetch instructions into the code in advance of the identified data references so that multiple prefetch instructions are issued for a given data reference. In this way, the given data reference is prefetched even if the computer system drops a prefetch instruction for the given data reference.

In a variation on the above embodiment, inserting the prefetch instructions involves ensuring that the multiple prefetch instructions for the given data reference are issued at different times, so that a single event is unlikely to cause all of the multiple prefetch instructions for the given data reference to be dropped by the computer system.

In a variation on the above embodiment, inserting prefetch instructions involves issuing each of the multiple prefetch instructions for the given data reference in a different loop iteration.

One embodiment of the present invention provides a system for generating code to perform anticipatory prefetching for data references. During operation, the system receives code to be executed on a computer system. The system then analyzes this code to identify data references to be prefetched. Next, the system inserts prefetch instructions into the code in advance of the identified data references. During this insertion process, the system identifies a location in the code where a prefetch address for a given prefetch instruction is calculated, and inserts the given prefetch instruction as far ahead of a corresponding data reference operation as possible, but not before the location where the prefetch address is calculated.

In a variation on the above embodiment, inserting the given prefetch instruction can involve inserting the given prefetch instruction into a preceding block in the code.

In a variation on the above embodiment, while inserting the given prefetch instruction the system traces execution of the code to produce an execution trace. The system uses this execution trace to identify a preceding block in which the prefetch address is calculated. Next, the system inserts the given prefetch instruction into the preceding block after the location where the prefetch address is calculated.

BRIEF DESCRIPTION OF THE FIGURES

FIG. 5 is a flow chart illustrating the process of analyzing array subscripts to identify references for prefetching in accordance with an embodiment of the present invention.

FIG. 6 is a flow chart illustrating the process of calculating a prefetch address for a subsequent loop iteration in accordance with an embodiment of the present invention.

Table 1 illustrates marking of an exemplary section of code in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computer System

Figure 1:
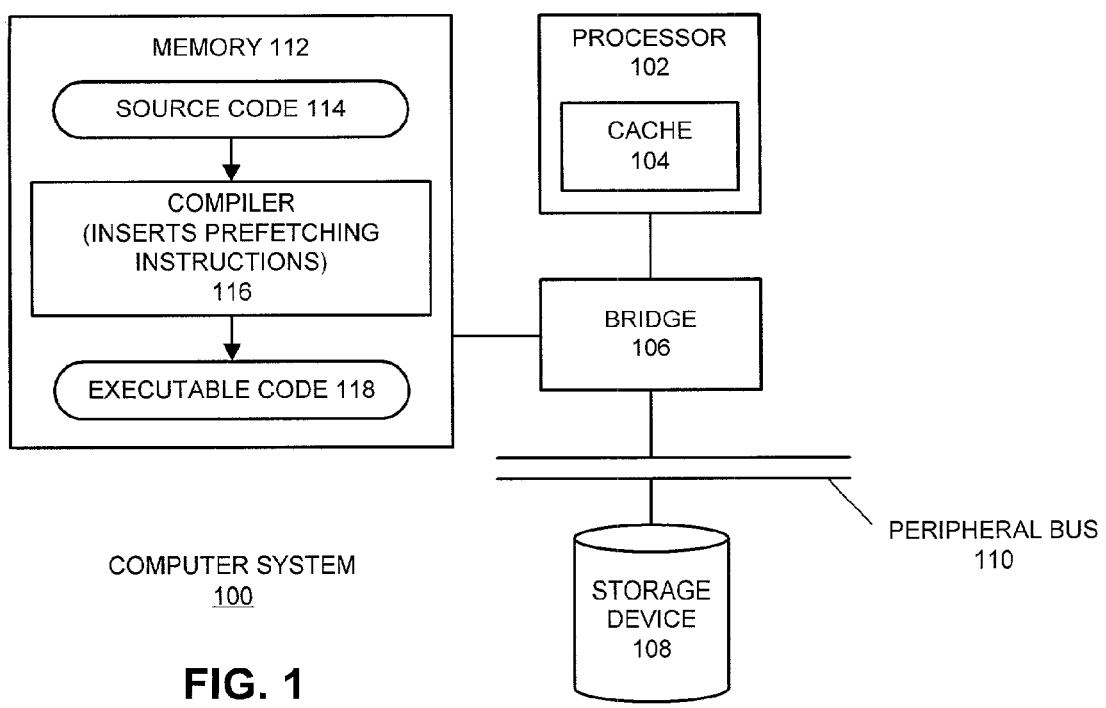
FIG. 1 illustrates a computer system in accordance with an embodiment of the present invention.

FIG. 1 illustrates a computer system 100 in accordance with an embodiment of the present invention. As illustrated in FIG. 1, computer system 100 includes processor 102, which is coupled to a memory 112 and to peripheral bus 110 through bridge 106. Bridge 106 can generally include any type of circuitry for coupling components of computer system 100 together.

Processor 102 can include any type of processor, including, but not limited to, a microprocessor, a mainframe computer, a digital signal processor, a personal organizer, a device controller and a computational engine within an appliance. Processor 102 includes a cache 104 that stores code and data for execution by processor 102.

Note that the effect of a prefetch operation is to cause a cache line to be retrieved from memory 112 into cache 104 before processor 102 accesses the cache line. Note that many computer systems employ both a level-two (L2) cache as well as a level-one (L1) cache. In this type of computer system, a prefetch operation can cause a cache line to be pulled into L2 cache as well as L1 cache. Note that all of the following discussion relating to prefetching an L1 cache line applies to prefetching an L2 cache line. Furthermore, note that the present invention can also be applied to computer systems with more than two levels of caches.

Processor 102 communicates with storage device 108 through bridge 106 and peripheral bus 110. Storage device 108 can include any type of non-volatile storage device that can be coupled to a computer system. This includes, but is not limited to, magnetic, optical, and magneto-optical storage devices, as well as storage devices based on flash memory and/or battery-backed up memory.

Processor 102 communicates with memory 112 through bridge 106. Memory 112 can include any type of memory that can store code and data for execution by processor 102.

As illustrated in FIG. 1, memory 112 contains compiler 116. Compiler 116 converts source code 114 into executable code 118. In doing so, compiler 116 inserts explicit prefetch instructions into executable code 118 as is described in more detail below with reference to FIGS. 2-8.

Note that although the present invention is described in the context of computer system 100 illustrated in FIG. 1, the present invention can generally operate on any type of computing device that can accommodate explicit prefetch instructions. Hence, the present invention is not limited to the specific computer system 100 illustrated in FIG. 1.

Compiler

Figure 2:
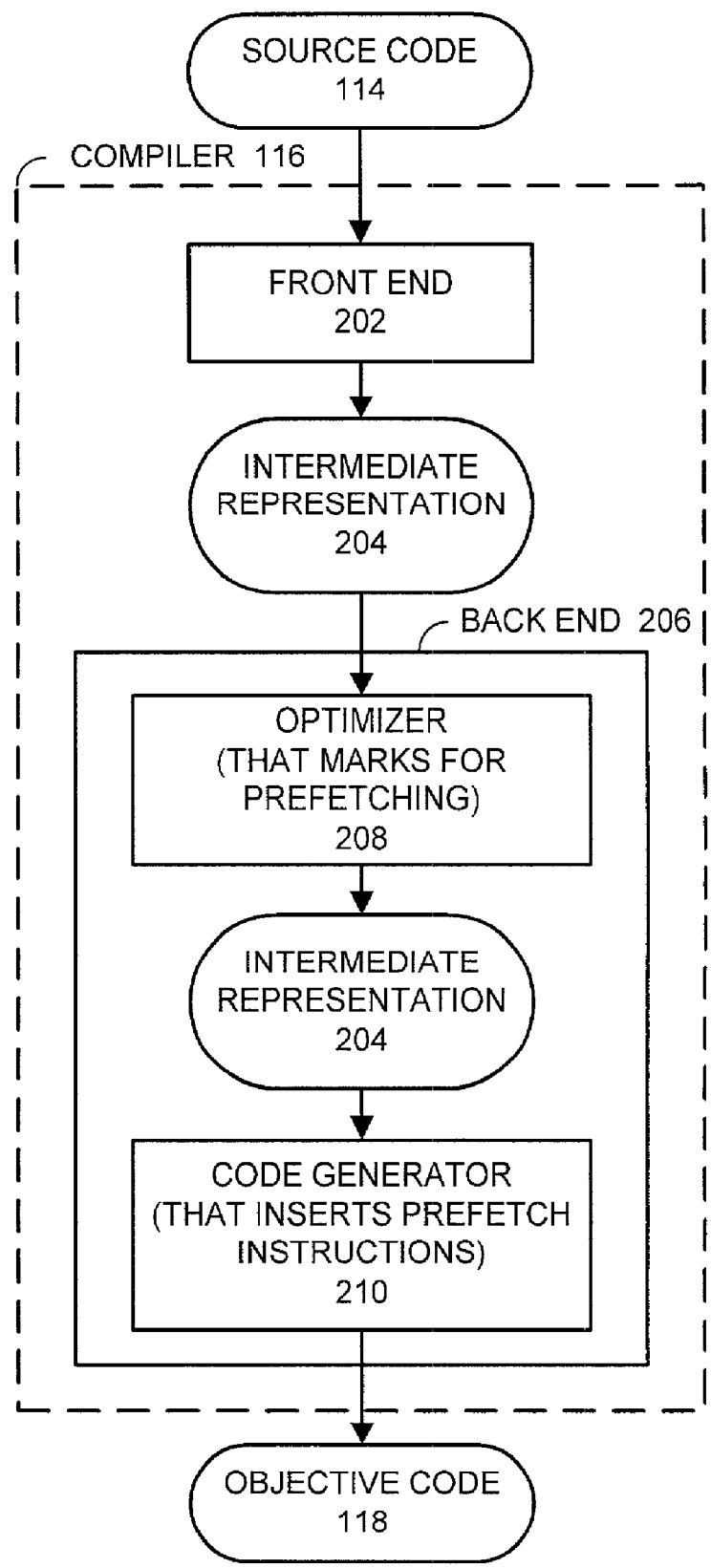
FIG. 2 illustrates a compiler in accordance with an embodiment of the present invention.

FIG. 2 illustrates the structure of compiler 116 in accordance with an embodiment of the present invention. Compiler 116 takes as input source code 114 and outputs executable code 118. Note that source code 114 may include any computer program written in a high-level programming language, such as the JAVA™ programming language. Executable code 118 includes executable instructions for a specific virtual machine or a specific processor architecture.

Compiler 116 includes a number of components, including as front end 202 and back end 206. Front end 202 takes in source code 114 and parses source code 114 to produce intermediate representation 204.

Intermediate representation 204 feeds into back end 206, which operates on intermediate representation 204 to produce executable code 118. During this process, intermediate representation 204 feeds through optimizer 208, which identifies and marks data references within the code as candidates for prefetching. The output of optimizer 208 feeds into code generator 210, which generates objective code 118. In doing so, code generator 210 inserts prefetch instructions into the code in advance of associated data references.

Process of Inserting Prefetch Instructions

Figure 3:
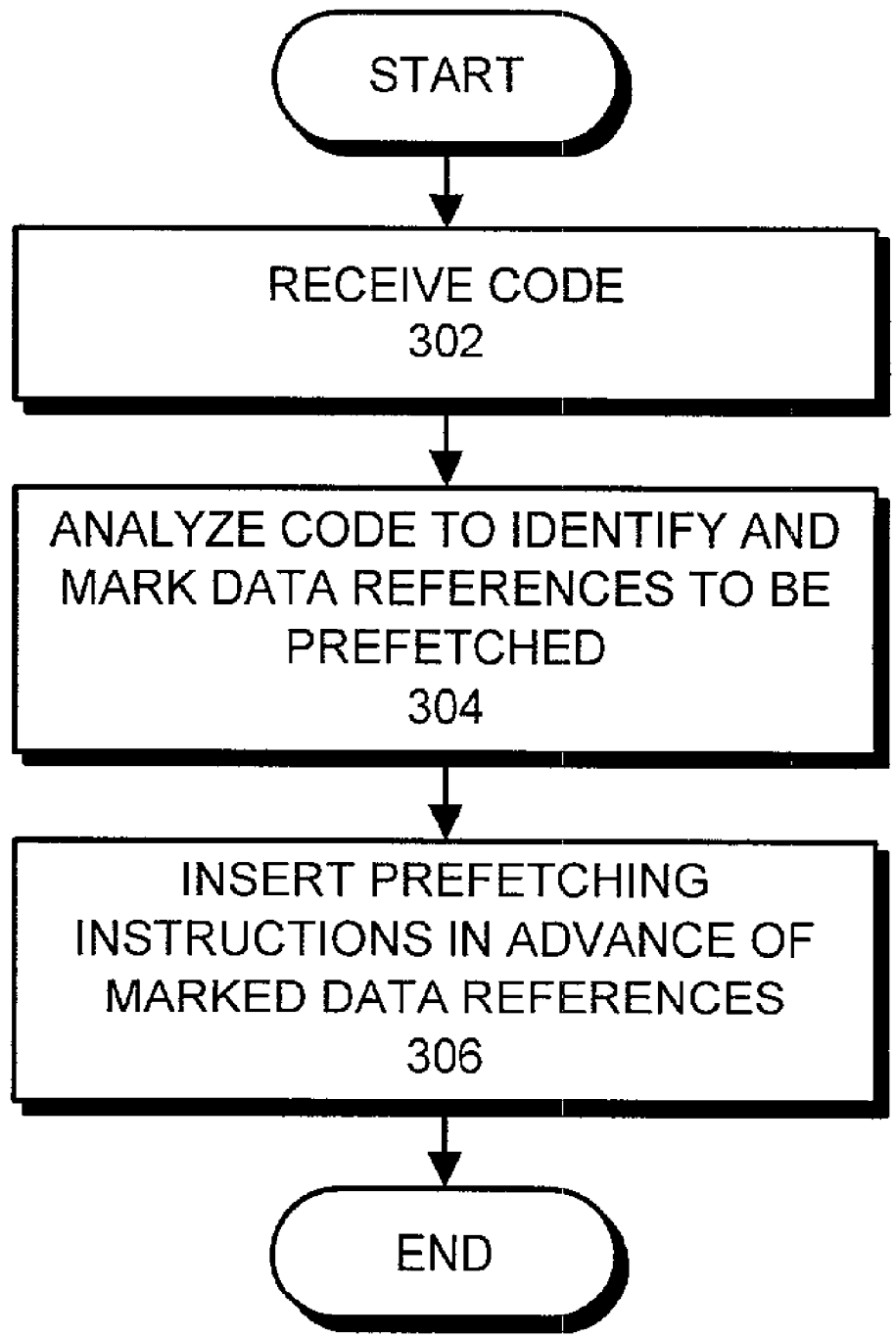
FIG. 3 is a flow chart illustrating the process of inserting prefetch instructions into code in accordance with an embodiment of the present invention.

FIG. 3 is a flow chart illustrating the process of inserting prefetch instructions into code in accordance with an embodiment of the present invention. During operation, the system receives source code 114 (step 302), and converts source code into intermediate representation 204. Intermediate representation 204 feeds into optimizer 208, which analyzes intermediate representation 204 to identify and mark references to be prefetched (step 304). Next, code generator 210 inserts prefetch instructions in advance of the marked data references (step 306).

Two-Phase Marking

Figure 4:
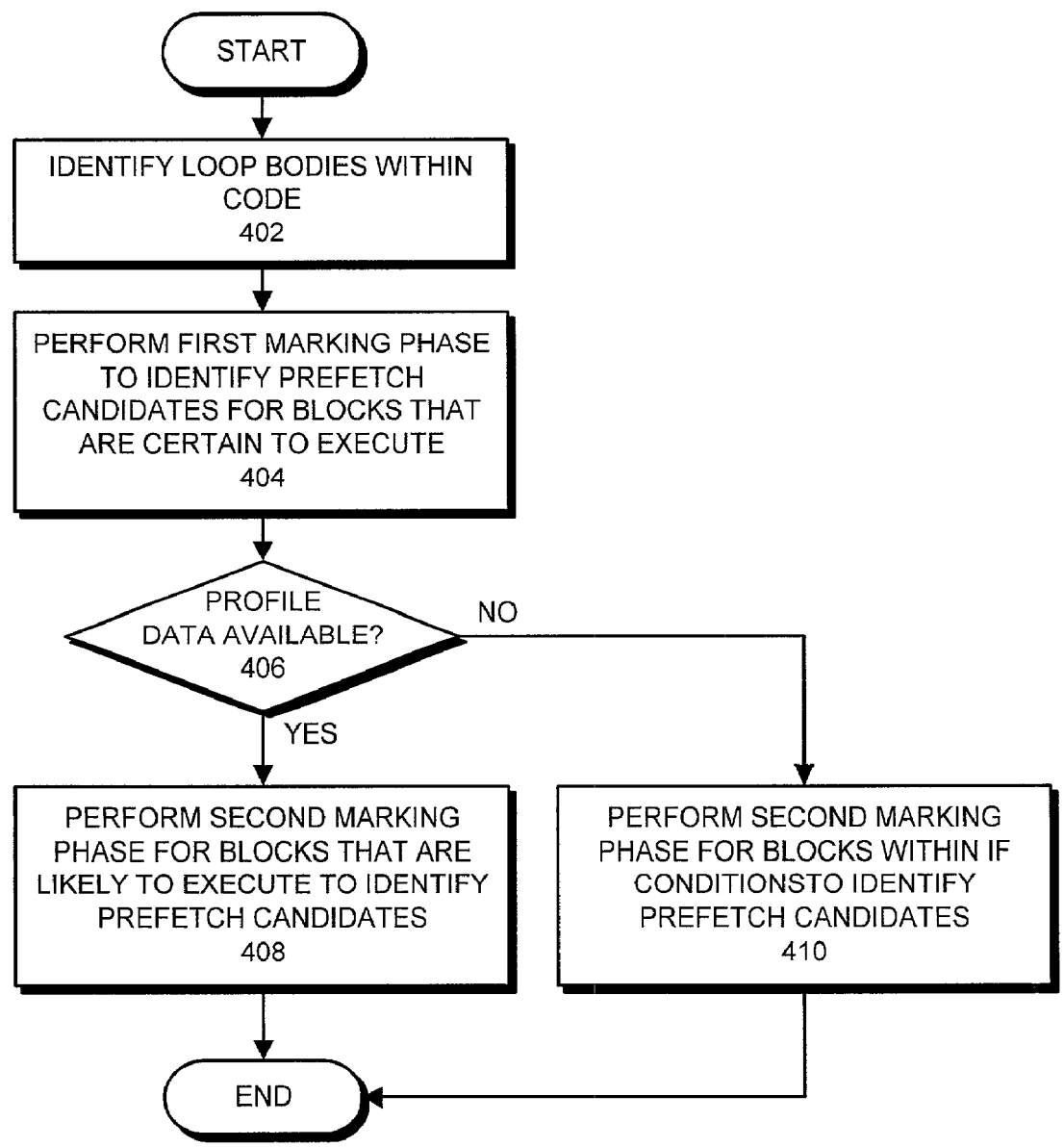
FIG. 4 is a flow chart illustrating the process of performing two-phase marking to identify references for prefetching in accordance with an embodiment of the present invention.

FIG. 4 is a flow chart illustrating the process of performing two-phase marking to identify references for prefetching in accordance with an embodiment of the present invention. In this embodiment, the system starts by identifying loop bodies within the code (step 402). The system then looks for prefetching candidates within the loop bodies because these loop bodies are executed frequently, and references within these loop bodies are likely to have a predictable pattern. However, note that the present invention is not meant to be limited to systems that consider only references within loop bodies.

In one embodiment of the present invention, if there exists a nested loop the system examines an innermost loop in the nested loop. If the innermost loop is smaller than a minimum size or is executed fewer than a minimum number of iterations, the system examines a loop outside the innermost loop.

In one embodiment of the present invention, the system also determines if there are heavyweight calls within the loop. These heavyweight calls can do a significant amount of work involving movement of data to/from the cache, and can thereby cause prefetching to be ineffective. If such heavyweight calls are detected, the system can decide not to prefetch for the loop. Note that lightweight functions, such as intrinsic function calls are not considered "heavyweight" calls.

In one embodiment of the present invention, the system determines the data size for the loop either at compile time or through profiling information. If this data size is small, there is a high probability that the data for the loop will completely fit within the cache, in which case prefetching is not needed.

The system them performs a two-phase marking process. During a first phase, the system attempts to identify prefetching candidates from basic blocks that are certain to execute (step 404).

Next, during a second phase the system determines if profile data is available for the code (step 406). This profile data indicates how frequently specific basic blocks of the code are likely to be executed.

If profile data is available, the system identifies prefetching candidates from basic blocks that are likely but not certain to execute (step 408). Note that the system can determine if a basic block is likely to execute by comparing a frequency of execution from the execution profile with a threshold value.

If profile data is not available, the system identifies prefetching candidates from basic blocks located within "if" conditions, whether or not the basic blocks are likely to execute (step 410).

For example, consider the exemplary code that appears in Table 1 below.

TABLE 1

| 1 | for(i=0;i<n;i++) { | |
| 2 | w= a[i]; | ←PREFETCH |
| 3 | if(condition) { | |
| 4 | x=a[i]; | ←COVERED |
| 5 | y=a[i-1]; | ←COVERED |
| 6 | z=a[i+1]; | ←PREFETCH |
| 7 | } | |
| 8 | } | |

Table 1 illustrates a "for" loop in the C programming language. During the first phase, the system analyzes the basic block containing line 2 "w=a[i]", because the basic block is certain to execute. During this first phase, the access to a[i] is marked for prefetching.

During the second phase, the system analyzes the basic block including lines 4-6. Note that this basic block only executes if the condition for the preceding "if" statement is TRUE. In one embodiment of the present invention, this basic block is analyzed if an execution profile indicates that it is likely to execute.

If this basic block is analyzed, the reference to a[i] in line 4 is marked as covered because a[i] is retrieved in the preceding loop iteration by the statement in line 6 which references a[i+1]. Similarly, the reference to a[i−1] is marked as covered because a[i−1] is retrieved in a preceding loop iteration by the statement in line 6 which references a[i+1].

Note that if a one-phase marking process is used in which all basic blocks are considered regardless of if they are certain to execute, the statement at line 2 is marked as covered by the statement at line 6, and no prefetch is generated for the reference to a[i] in line 2. This is a problem if the basic block containing lines 4-6 is not executed, because no prefetch is generated for the reference to a[i] in line 2

Analyzing Array Subscripts

FIG. 5 is a flow chart illustrating the process of analyzing array subscripts in order to identify references for prefetching in accordance with an embodiment of the present invention. In this embodiment, the system starts by identifying loop bodies within the code (step 502). Next, within a given loop body, the system locates an array reference with its array subscripts (step 504). The system then chases down dependencies associated with these array subscripts (step 506) in order to determine a function of an array subscript in terms of the loop index (step 508).

Next, the system uses this function to calculate a difference between array indexes for consecutive loop iterations (step 510). This difference is referred to as the "stride" of the array reference. The system then marks the array reference as a candidate for prefetching if this stride is a constant value for some (but not necessarily all) loop iterations (step 512).

For example, consider the case where the loop index is "i" and the function is f(i)=(2*i) % n, where "%" is the modulo operator. In this case, the stride is usually 2, except for when 2*i exceeds a multiple of n, in which case the stride is determined by the modulo operator and n. If n is large, say 200, this exception occurs very rarely. Hence, in this example, the system marks the array reference a[i] for prefetching, even though the stride is not constant for all loop iterations.

Process of Calculating a Prefetch Address

FIG. 6 is a flow chart illustrating the process of calculating a prefetch address for a subsequent loop iteration in accordance with an embodiment of the present invention. This process takes place during the process of inserting prefetch instructions for marked data references in step 306 of FIG. 3.

During this insertion process, the system first determines if a stride can be calculated for a marked reference (step 602). If not, the system sets the stride and the prefetch ahead distance to a default values and jumps to step 616 (step 610). In one embodiment of the present invention, this default value causes the system to fetch the next consecutive cache line. Fetching the next consecutive line tends to increase performance because larger cache lines tend to be useful. Hence, fetching the next consecutive cache line has the same effect as fetching a larger cache line.

In one embodiment of the present invention, the system maintains information for each prefetching candidate. This information includes a pointer to a stride computing instruction, the stride value (determined above), and an addressing mode of the prefetching candidate (which helps in generating a prefetch address instruction).

If the stride can be calculated in step 602, the system calculates the stride by first identifying an induction variable, which is typically a loop counter (step 604), and identifying a stride function (step 606). The system then calculates the stride based on the induction variable and the stride function (step 608).

Next, the system performs a number of operations before calculating the prefetch address. In doing so, the system calculates a "prefetch ahead distance", which indicates how many loop iterations ahead to prefetch for. The system also considers the prefetch latency and the execution time of the loop.

The system starts by calculating the "prefetch cover distance" over the list of prefetch candidates (step 612). This prefetch cover distance is calculated as the cache line size divided by the stride. The prefetch cover distance indicates how many strides are covered by a single prefetch and is used to avoid prefetching the same cache line.

The system also computes the execution time for a single loop iteration, $et_{sl}$, by adding the adjusted execution time for each basic block in the loop. The adjusted execution time for a basic block is the execution time of the basic block multiplied by the execution probability of the basic block relative to the loop header.

The system then computes the prefetch ahead distance using the following function (step 614), prefetch ahead distance =
   min( max(1, prefetch latency/(prefetch cover distance*$et_{sl}$)),
      max(1, outstanding prefetches/number of prefetch streams) ).

Note that the "outstanding prefetches" value is a processor characteristic.

The system then calculates the prefetch address (step 616). This involves computing a prefetch constant by multiplying the stride by the prefetch cover distance and the prefetch ahead distance, and then adding the prefetch constant to the address accessed by the prefetch candidate.

The system then inserts the prefetch instruction, including any associated address generation instructions, into the code in the loop (step 618).

Multiple Redundant Prefetches

Figure 7:
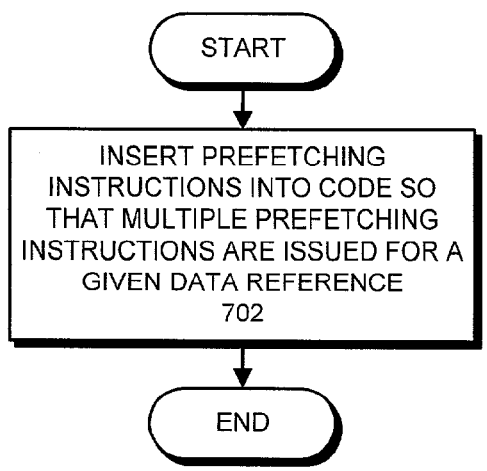
FIG. 7 is a flow chart illustrating the process inserting multiple redundant prefetch instructions for a data reference in accordance with an embodiment of the present invention.

FIG. 7 is a flow chart illustrating the process inserting multiple redundant prefetch instructions for a reference in accordance with an embodiment of the present invention. In this embodiment, the system inserts prefetch instructions into the code so that multiple prefetch instructions are issued for the same prefetch address (step 702). This ensures that the prefetch operation takes place even if some of the issued prefetch instructions are dropped by the underlying hardware. Prefetch operations are speculative and, hence, may not be doing useful work. Consequently, in situations where the system has to wait for a prefetch instruction, it is typically preferable to drop the prefetch instruction rather than to wait for the prefetch instruction.

Note that in multiple-issue processor architectures, there are often many unused instruction slots that can be filled with redundant prefetch operations without adversely affecting system performance.

Also note that as processor speeds continue to increase faster than memory access times, the cost of a cache miss is becoming increasingly severe. Hence, it is beneficial to issue redundant prefetch operations to potentially avoid a cache miss.

For example, consider a loop that performs an access to an array A with a stride of 64. Instead of merely issuing a prefetch for A in a first loop iteration, the code issues multiple prefetches to A, A+64 and A+128. In a second loop iteration, the code again issues prefetches for A, A+64 and A+128. However, note that the prefetch for A+64 in the first iteration prefetches the same value as the prefetch for A in the second iteration. Similarly, the prefetch for A+128 in the first iteration prefetches the same value as the prefetch for A+64 in the second iteration.

In this way, a prefetch for a given access to array A is issued three times in successive loop iterations. Note that the time separation between prefetches for a given data reference makes it unlikely that a single event will cause all of the prefetches for the given data reference to be dropped by the computer system.

Inserting a Prefetch Instruction into a Prior Block

Figure 8:
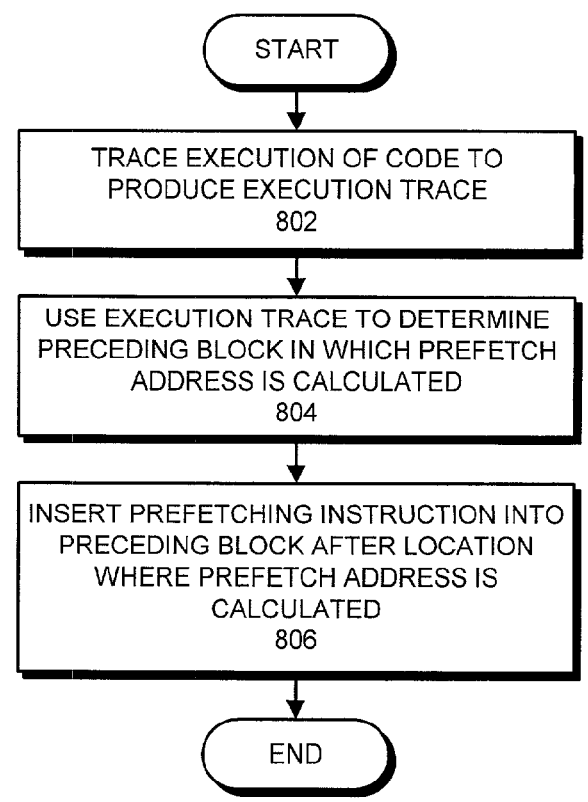
FIG. 8 is a flow chart illustrating the process of inserting prefetch instructions into a preceding block in accordance with an embodiment of the present invention.

FIG. 8 is a flow chart illustrating the process of inserting prefetch instructions into a preceding basic block in accordance with an embodiment of the present invention. In this embodiment, the system traces execution of the code to produce an execution trace (step 802). Next, the system uses the execution trace to identify a preceding block in which the prefetch address is calculated (step 804). The system then inserts a prefetch instruction into the preceding block after a location in which the prefetch address is calculated (step 806).

Note that as more processor clock cycles are required to retrieve a cache line from memory, it becomes more advantageous to issue a prefetch for a data reference as soon as possible. The easiest way to do this is to issue a prefetch instruction at the start of a basic block in which the corresponding data reference takes place. In order to push the prefetch instruction as far back as possible, the present invention uses an execution trace to determine a preceding basic block in which the prefetch address is calculated, and then inserts the prefetch instruction into the preceding basic block.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for generating code to perform anticipatory prefetching for data references, comprising:
   receiving code to be executed on a computer system;
   analyzing the code to identify data references to be prefetched;
   calculating an execution time of a single loop iteration which includes the identified data references, wherein the execution time includes an adjustment for the execution probability of the identified data references;
   calculating a prefetch ahead distance, wherein the prefetch ahead distance includes the ratio of outstanding prefetches to the number of prefetch streams and considers the probabilistically adjusted execution time of the single loop iteration, and wherein the prefetch ahead distance indicates how many loop iterations ahead to prefetch for; and
   inserting prefetch instructions into a preceding basic block of the code in advance of the identified data references based upon the prefetch ahead distance, wherein inserting prefetch instructions involves inserting multiple prefetch instructions for a given cache line, and wherein inserting the prefetch instructions involves,
      attempting to calculate a stride value for a given data reference within a loop,
      if the stride value cannot be calculated, setting the stride value to a default stride value, and
      inserting a prefetch instruction to prefetch the given data reference for a subsequent loop iteration based on the stride value;
   wherein the stride value is constant for some but not necessarily all loop iterations.

2. The method of claim 1, further comprising allowing a system user to specify the default stride value.

3. The method of claim 1, wherein calculating the stride value involves:
   identifying an induction variable for the stride value;
   identifying a stride function for the stride value; and
   calculating the stride value based upon the stride function and the induction variable.

4. The method of claim 1, wherein inserting the prefetch instruction based on the stride value involves:
   calculating a prefetch cover distance by dividing a cache line size by the stride value;
   calculating a prefetch ahead distance as a function of a prefetch latency, the prefetch cover distance and an execution time of a loop; and
   calculating a prefetch address by multiplying the stride value by the prefetch cover distance and the prefetch ahead distance and adding the result to an address accessed by the given data reference.

5. The method of claim 1, wherein analyzing the code involves:
   identifying loop bodies within the code; and
   identifying data references to be prefetched from within the loop bodies.

6. The method of claim 5, wherein analyzing the code to identify data references to be prefetched involves examining a pattern of data references over multiple loop iterations.

7. The method of claim 1, wherein analyzing the code involves analyzing the code within a compiler.

8. A computer-readable storage medium storing instructions that when executed by a computer cause the computer to perform a method for generating code to perform anticipatory prefetching for data references, the method comprising:
   receiving code to be executed on a computer system;
   analyzing the code to identify data references to be prefetched;
   calculating an execution time of a single loop iteration which includes the identified data references, wherein the execution time includes an adjustment for the execution probability of the identified data references;
   calculating a prefetch ahead distance, wherein the prefetch ahead distance includes the ratio of outstanding prefetches to the number of prefetch streams and considers the probabilistically adjusted execution time of the single loop iteration, and wherein the prefetch ahead distance indicates how many loop iterations ahead to prefetch for; and inserting prefetch instructions into a preceding basic block of the code in advance of the identified data references based upon the prefetch ahead distance, wherein inserting prefetch instructions involves inserting multiple prefetch instructions for a given cache line, and wherein inserting the prefetch instructions involves, attempting to calculate a stride value for a given data reference within a loop, if the stride value cannot be calculated, setting the stride value to a default stride value, and inserting a prefetch instruction to prefetch the given data reference for a subsequent loop iteration based on the stride value;

wherein the stride value is constant for some but not necessarily all loop iterations.

9. The computer-readable storage medium of claim 8, wherein the method further comprises allowing a system user to specify the default stride value.

10. The computer-readable storage medium of claim 8, wherein calculating the stride value involves:
identifying an induction variable for the stride value;
identifying a stride function for the stride value; and
calculating the stride value based upon the stride function and the induction variable.

11. The computer-readable storage medium of claim 8, wherein inserting the prefetch instruction based on the stride value involves:
calculating a prefetch cover distance by dividing a cache line size by the stride value;
calculating a prefetch ahead distance as a function of a prefetch latency, the prefetch cover distance and an execution time of a loop; and
calculating a prefetch address by multiplying the stride value by the prefetch cover distance and the prefetch ahead distance and adding the result to an address accessed by the given data reference.

12. The computer-readable storage medium of claim 8, wherein analyzing the code involves analyzing the code within a compiler.

13. An apparatus that generates code to perform anticipatory prefetching for data references, comprising:
a receiving mechanism that is configured to receive code to be executed on a computer system;
an analysis mechanism that is configured to analyze the code to identify data references to be prefetched;
a calculating mechanism that is configured to calculate an execution time of a single loop iteration which includes the identified data references, wherein the execution time includes an adjustment for the execution probability of the identified data references;

a calculating mechanism that is configured to calculate a prefetch ahead distance, wherein the prefetch ahead distance includes the ratio of outstanding prefetches to the number of prefetch streams and considering the probabilistically adjusted execution time of the single loop iteration, and wherein the prefetch ahead distance indicates how many loop iterations ahead to prefetch for; and an insertion mechanism that is configured to insert prefetch instructions into a preceding basic block of the code in advance of the identified data references based upon the prefetch ahead distance, wherein the insertion mechanism facilitates inserting multiple prefetch instructions for a given cache line;

wherein the insertion mechanism is configured to,
attempt to calculate a stride value for a given data reference within a loop,
set the stride value to a default stride value if the stride value cannot be calculated, and to
insert a prefetch instruction to prefetch the given data reference for a subsequent loop iteration based on the stride value;

wherein the stride value is constant for some but not necessarily all loop iterations.

14. The apparatus of claim 13, further comprising a configuration mechanism that is configured to receive the default stride value from a system user.

15. The apparatus of claim 13, wherein while calculating the stride value, the insertion mechanism is configured to:
identify an induction variable for the stride value;
identify a stride function for the stride value; and to
calculate the stride value based upon the stride function and the induction variable.

16. The apparatus of claim 13, wherein the insertion mechanism is configured to:
calculate a prefetch cover distance by dividing a cache line size by the stride value;
calculate a prefetch ahead distance as a function of a prefetch latency, the prefetch cover distance and an execution time of a loop; and to
calculate a prefetch address by multiplying the stride value by the prefetch cover distance and the prefetch ahead distance and adding the result to an address accessed by the given data reference.

17. The apparatus of claim 13, wherein the apparatus resides within a compiler.

* * * * *